United States Patent [19]

Inaba et al.

[11] Patent Number: 4,481,568
[45] Date of Patent: Nov. 6, 1984

[54] NUMERICAL CONTROL METHOD AND APPARATUS

[75] Inventors: Hajimu Inaba, Hino; Yukio Ono, Yokohama; Mitsuo Hiraizumi, Hachioji, all of Japan

[73] Assignee: Fujitsu Fanuc Limited, Tokyo, Japan

[21] Appl. No.: 313,614

[22] Filed: Oct. 21, 1981

[30] Foreign Application Priority Data

Oct. 23, 1980 [JP] Japan ............................ 55-148760

[51] Int. Cl.³ .............................................. G06F 15/46
[52] U.S. Cl. ....................................... 364/167; 364/474; 364/513; 318/568
[58] Field of Search ............... 364/167, 168, 169, 170, 364/474, 513, 174; 318/567, 568, 569, 600, 601

[56] References Cited

U.S. PATENT DOCUMENTS

| | | | |
|---|---|---|---|
| 3,725,652 | 4/1973 | Konvalina | 318/568 |
| 3,812,474 | 5/1974 | Linn et al. | 364/168 |
| 3,843,875 | 10/1974 | Goodstal et al. | 364/167 |
| 3,909,600 | 9/1975 | Hohn | 364/513 |
| 4,025,838 | 5/1977 | Watanke | 364/513 |
| 4,085,691 | 4/1978 | Coughenour | 318/568 |
| 4,116,143 | 9/1978 | Manake | 318/568 |
| 4,125,943 | 11/1978 | Ando | 318/568 |
| 4,131,837 | 12/1978 | Whetham | 364/474 |
| 4,142,472 | 3/1979 | Solda et al. | 318/568 |
| 4,146,924 | 3/1979 | Birk et al. | 318/568 |
| 4,150,326 | 4/1979 | Engelberger | 318/568 |
| 4,150,427 | 4/1979 | Slawson | 364/474 |
| 4,212,031 | 7/1980 | Schmitt et al. | 364/474 |
| 4,287,459 | 9/1981 | Dahlstöm | 318/568 |
| 4,302,097 | 11/1981 | Chlestil | 318/568 |
| 4,328,050 | 5/1982 | Ashizawa et al. | 318/568 |
| 4,328,550 | 5/1982 | Weber | 364/474 |
| 4,338,659 | 7/1982 | Kurakake | 364/474 |
| 4,356,554 | 10/1982 | Susnjara et al. | 364/513 |
| 4,365,301 | 12/1982 | Arnold et al. | 364/167 |
| 4,366,424 | 12/1982 | McKechnie | 318/568 |

*Primary Examiner*—Jerry Smith
*Assistant Examiner*—John R. Lastova
*Attorney, Agent, or Firm*—Staas & Halsey

[57] ABSTRACT

A numerical control method and apparatus for controlling the movement of a movable member by setting entry forbidden areas which the movable member is forbidden to enter. Entry forbidden information relating to the boundaries of the entry forbidden areas is created and stored in memory, the current position of the movable member is monitored, the entry forbidden information is used to determine whether the current position of the movable member has entered a forbidden area, and the movement of the movable member is halted when the current position thereof has entered an entry forbidden area.

9 Claims, 7 Drawing Figures

| 00 "1" | 01 "1" | 02 "1" | 03 "1" | 04 "1" | 05 "1" | 06 "1" | 07 "1" |
|---|---|---|---|---|---|---|---|
| 08 "1" | 09 "0" | 0A "0" | 0B "0" | 0C "0" | 0D "0" | 0E "1" | 0F "1" |
| 10 "1" | 11 "0" | 12 "1" | 13 "0" | 14 "0" | 15 "0" | 16 "1" | 17 "1" |
| 18 "1" | 19 "0" | 1A "1" | 1B "0" | 1C "1" | 1D "0" | 1E "1" | 1F "1" |
| 20 "1" | 21 "0" | 22 "0" | 23 "0" | 24 "1" | 25 "0" | 26 "1" | 27 "1" |
| 28 "1" | 29 "0" | 2A "0" | 2B "0" | 2C "0" | 2D "0" | 2E "1" | 2F "1" |
| 30 "1" | 31 "1" | 32 "1" | 33 "1" | 34 "1" | 35 "1" | 36 "1" | 37 "1" |

NUMERICAL CONTROL METHOD AND APPARATUS

BACKGROUND OF THE INVENTION

This invention relates to a numerical control method and apparatus and, more particularly, to a numerical control method and apparatus in which flawing and attendant loss of a workpiece can be prevented by establishing and then prestoring in memory the areas which a movable member is forbidden to enter, and by adopting an arrangement wherein movement of the movable member is halted instantaneously as soon as the movable member enters the forbidden area during a machining operation.

Numerically controlled machine tools possess a movable member such as a tool or a table which is transported by means of a ball screw, and such factors as the length of the ball screw determine the maximum area over which the movable member can be transported. Since the movable member may inadvertently be caused to exceed the boundary of said area (a phenomenon referred to as "over-travel") by a programming error or malfunction, it is conventional practice to detect the overtravel as soon as it occurs and then bring the movable member to an emergency stop. To achieve such overtravel detection, it is customary to provide limit switches at the points of maximum stroke on the $+X$, $-X$ and $+Z$, $-Z$ sides of the area of allowable movement, and to provide a dog on the movable member, the arrangement being such that the dog presses against a limit switch when the movable member overtravels. The actuated limit switch produces a signal indicative of the overtravel event.

It is quite common in systems of the type described above to have a smaller area, within the area of allowable movement mentioned above, which the movable member is forbidden to enter. One example of such is the area defined within the final shape of the workpiece, that is, the final shape into which the workpiece is to be machined, referred to as the "commanded shape". For a tool to penetrate this area to a very small degree would cause only a negligibly small drop off in cutting precision, but penetration beyond a predetermined amount would cause the tool to cut too deeply into the workpiece and render it useless as a final product. Wasting workpieces in this manner obviously represents poor economy since the materials are costly.

Another example of a forbidden area is that occupied by the chuck provided on a lathe. A tool caused to penetrate this area would strike the chuck and result in damage or breakage of both the tool and chuck.

Such inadvertent movement of a movable member as described above can be caused by a malfunction in the arithmetic unit of a numerical control device, by an error in an NC tape read operation, by operator error, or by failure in a servo system. The prior art has been conspicuously devoid of truly satisfactory means for detecting penetration of a tool into a forbidden area. For example, one expedient has been to attach a sensor or limit switch to the chuck in order to detect contact between it and the tool. However, attaching the sensor or limit switch to the chuck is a difficult operation, the chuck takes on a more complicated structure, and costs are raised. Still other defects encountered with this expedient are that it is difficult to change or redefine the forbidden areas, and that it is not possible to detect tool penetration of the area defined by the commanded shape, even if the sensors or the like are mounted on the chuck.

SUMMARY OF THE INVENTION

Accordingly, it is an object of the present invention to provide a numerical control method and apparatus for preventing damage to an expensive tool or workpiece caused by a malfunction in the arithmetic unit of a numerical control device, by an error in an NC tape read operation, by operator error, or by a failure in a servo system.

Another object of the present invention is to provide a numerical control method and apparatus for detecting, in a reliable and simple manner, the penetration of a movable member such as a tool into a forbidden area.

A further object of the present invention is to provide a numerical control method and apparatus which enable a forbidden area to be redefined with facility even when there is a modification in the final shape of a workpiece.

These and other objects and features of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
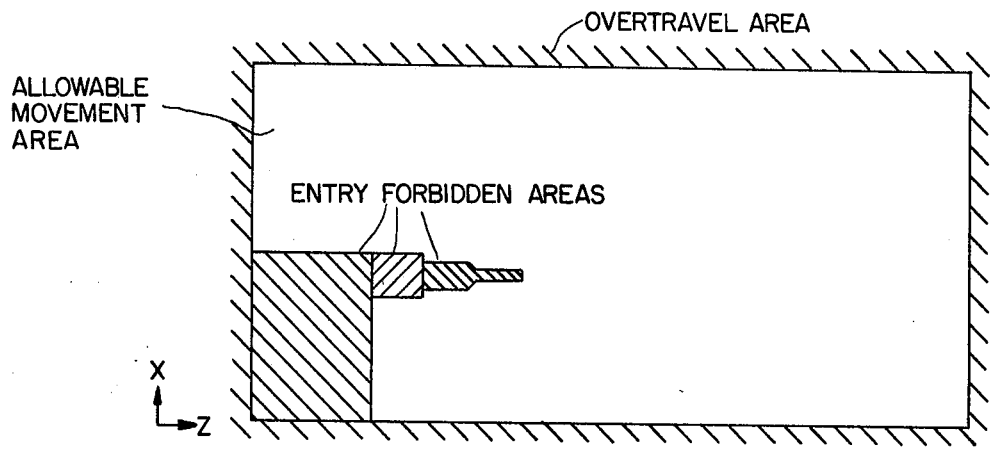
FIG. 1 is an illustrative view useful in describing the relationship between forbidden areas and the maximum area of allowable movement.

Referring first to FIG. 1, OTA represents an overtravel area within which is defined an area of allowable movement MA. Within the area MA there are defined areas $EPA_1$, $EPA_2$, $EPA_3$ into which entry of a tool is forbidden. These three areas therefore are referred to as entry forbidden areas. The entry forbidden areas $EPA_1$, $EPA_2$ define a shape approximating that of a chuck provided on a lathe. A tool, if it were to enter the areas $EPA_1$, $EPA_2$, would strike the chuck and inflict damage upon both itself and chuck. The entry forbidden area $EPA_3$ is decided by the commanded or final shape of the workpiece, that is, by the shape that would result by cutting the starting stock down to the allowable depth. If this area were penetrated by the tool, the workpiece would not be cut to the desired tolerance and would have to be rejected.

Figure 2:
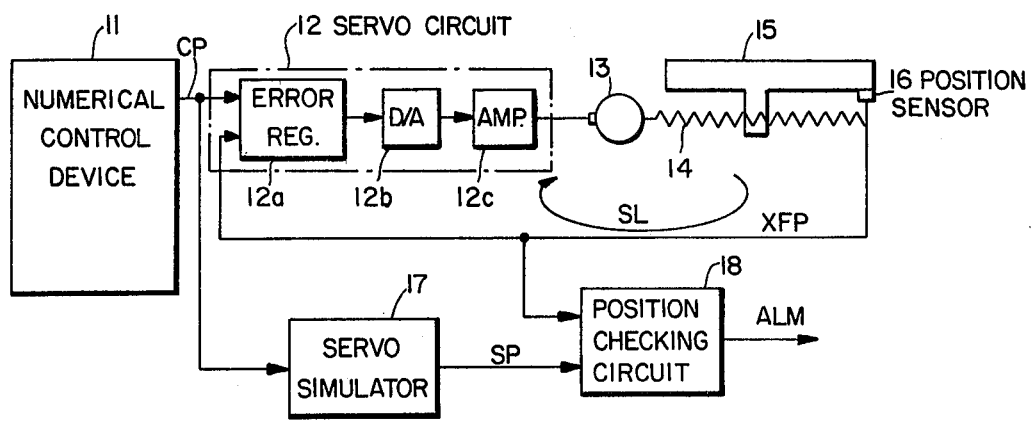
FIG. 2 is a block diagram for practicing the numerical control method of the present invention.

FIG. 2 is a block diagram of an apparatus for practicing the present invention. In the discussion that follows, movement will be described solely along the X-axis for the sake of simplicity. Therefore, the arrangement of FIG. 2 pertains to the X-axis only. A similar arrangement would be provided for each of the other controlled axes.

In FIG. 2, numeral 11 denotes a numerical control device containing a so-called pulse distributor for executing a pulse distribution operation on the basis of a move command in order to generate distributed pulses CP. A wellknown servo circuit 12, which receives the distributed pulses CP, includes an error register 12a for computing the difference between the distributed pulses CP and feedback pulses XFP (which will be described later), a DA converter 12b for producing an analog voltage corresponding to the difference computed by the error register 12a, and an amplifier 12c for amplifying the analog voltage. The amplified analog voltage from servo circuit 12 is applied to a DC motor 13, the motor being driven thereby so as to make the computed difference approach a value of zero. A ball screw 14 is driven by the DC motor 13 to transport a movable member, which is a table 15 in the present embodiment. A position sensor 16 such as a pulse coder is adapted to generate a single pulse for each prescribed increment of movement of the table 15. Each pulse serves as a feedback pulse XFP, which is applied to the input side of the error register 12a in the servo circuit 12. The distributed pulses from the numerical control device are applied also to a simulator 17. Ordinarily, the DC motor 13 exhibits a primary delay characteristic. In other words, rather than rotating immediately in response to each pulse CP produced by the numerical control device 11, the DC motor 13 rotates and "follows up" pulses CP after a predetermined delay. The simulator 17, which is adapted to simulate the servo system characteristics, generates simulation pulses SP, which appear at time intervals approximately the same as those of the feedback pulses XFB. The construction of the simulator 17 is shown in FIG. 3.

Figure 3:
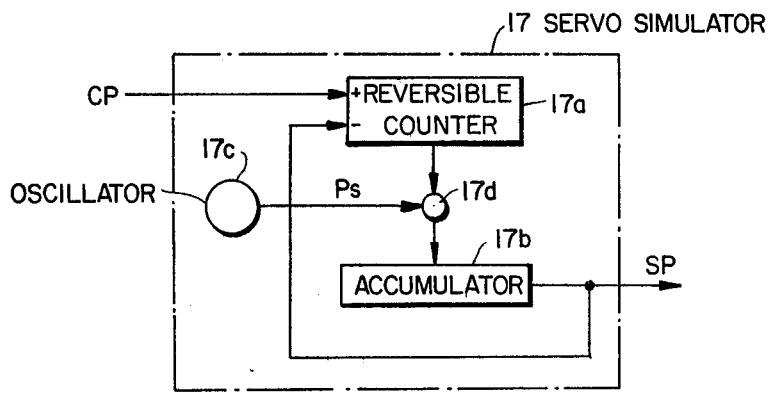
FIG. 3 is a block diagram of a simulator.

In FIG. 3, the simulator 17 is shown to include a reversible counter 17a which is adapted to count up the distributed pulses CP and to count down the simulation pulses SP, an accumulator 17b whose output is the simulation pulse train, an oscillator 17c for generating pulses $P_s$ of a constant frequency, and an adding circuit 17d which adds the value of the count held in reversible counter 17a to the accumulated value in accumulator 17b each time the oscillator 17c generates a pulse. If we assume that accumulator 17b can hold n-number of bits, then an overflow pulse will be obtained from the accumulator when the accumulated value exceeds $2^n$. The overflow pulses provided by the accumulator are the simulation pulses SP. Now, let the content of reversible counter 17a be e, let the pulse rate of the pulse generated by oscillator 17c be $f_o$, and let the pulse rate of the distributed pulses CP and of the simulation pulses SP be $F_i$ and $F_o$, respectively. The relationships among these values may be expressed by the following equations:

$$de/dt = F_1 - F_o \quad (1)$$

$$F_o = f_o/2^n \cdot e = k \cdot e \quad (2)$$

From Eqs. (1) and (2), e and $F_o$ may be written:

$$e = F_i/k[1 - \exp(-kt)] \quad (3)$$

$$F_o = F_i[1 - \exp(-kt)] \quad (4)$$

Thus, the simulator 17 is capable of simulating the primary delay characteristic of the servo system.

Figure 4:
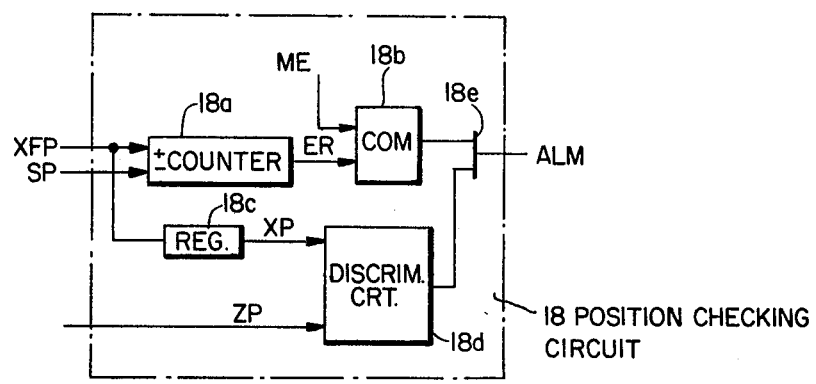
FIG. 4 is a block diagram of a current position checking circuit.

Returning to FIG. 2, the simulation pulses SP from the simulator 17 are applied to a current position checking circuit 18 whose other input is the train of feedback pulses XFP. The circuit 18 checks whether the table 15 has entered a forbidden area, or whether the difference between the simulation pulses SP and the feedback pulses XFP has exceeded a predetermined value ME. If the table has entered the forbidden area, or if said difference has exceeded the predetermined value ME, the current position checking circuit 18 issues an alarm signal ALM. Reference will now be had to FIG. 4 to describe the construction and operation of this circuit.

As illustrated in FIG. 4, the current position checking circuit 18 includes a reversible counter 18a for counting up the feedback pulses XFP and for counting down the simulation pulses SP, a comparator 18b for comparing the predetermined value ME and the content of reversible counter 18a, namely the difference ER between the feedback pulses XFB and the simulation pulses SP, and for producing a "1" logic level when ER is greater than ME (ER>ME), a current position register 18c for storing the current position $X_p$ of the table on the X-axis by having its content incremented or decremented by the feedback pulses XFB in accordance with the direction of table movement, a discrimination circuit 18d for determining, based on the current position ($X_p$, $Z_p$ of the table and on entry forbidden information, whether the current position of the table is within an entry forbidden area, and for producing a "1" logic level when such is indeed the case, and an OR gate 18e for delivering the alarm signal ALM, the inputs to the OR gate being the signals provided by the comparator 18b and by the discimination circuit 18d. In the foregoing, $X_p$ is the current position of the table when projected on the X-axis, and $Z_p$ the current position when projected on the Z-axis.

Figure 5:
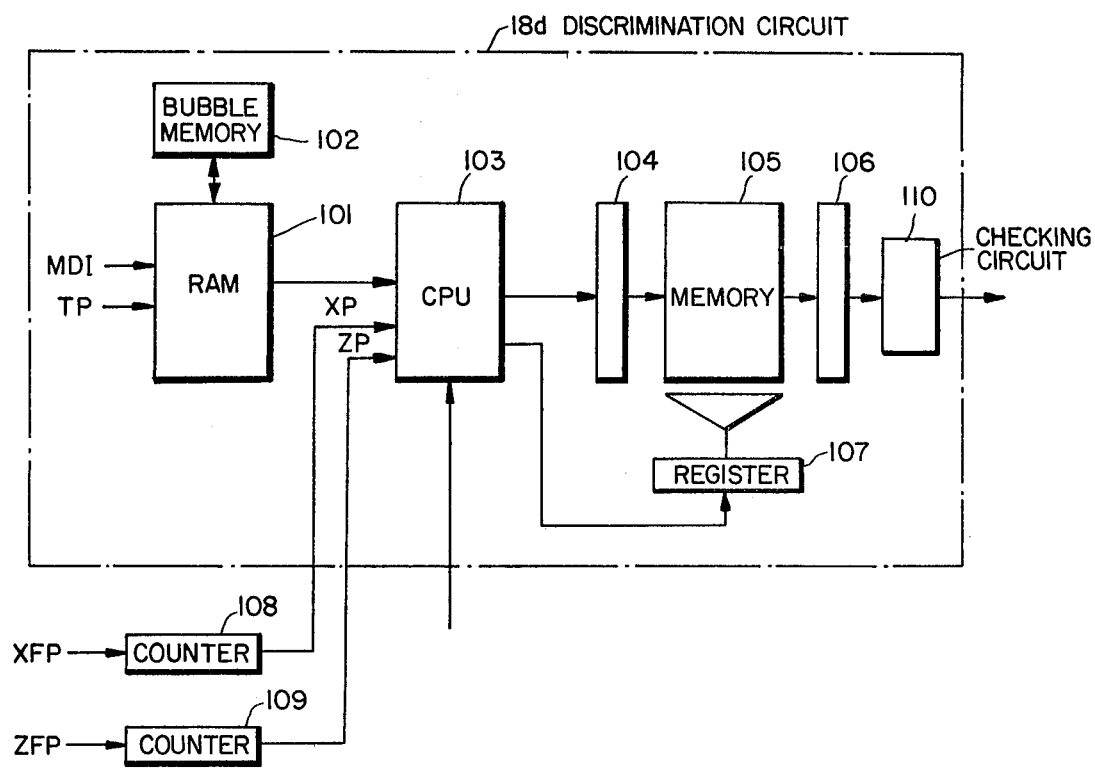
FIG. 5 is a block diagram of a discrimination circuit.
Figures 6, 7:
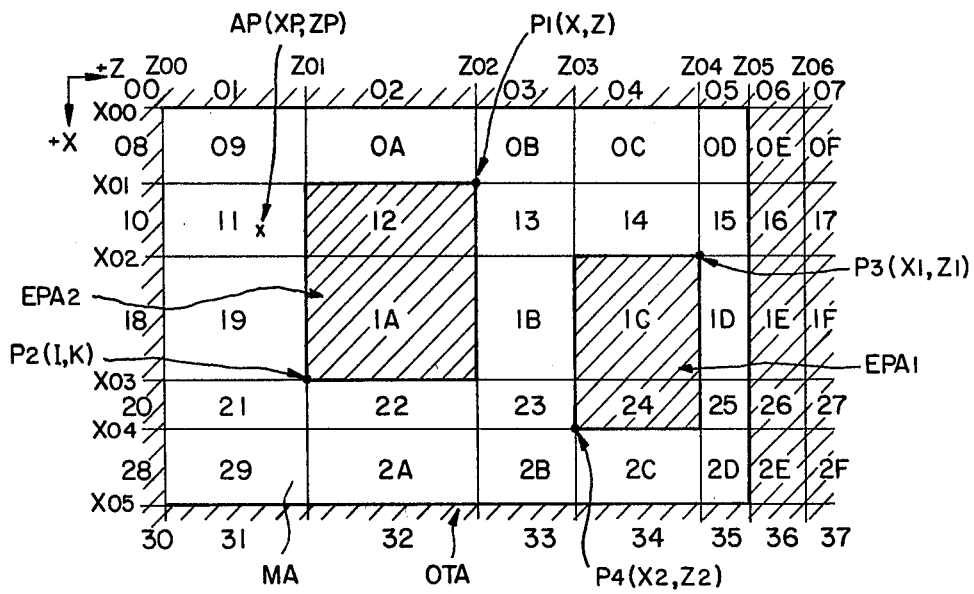
FIG. 6 is an illustrative view useful in describing how an area of allowable movement is divided into smaller sub-areas in accordance with the shape of forbidden areas.
FIG. 7 is an illustrative view useful in describing a case where entry forbidden information is written into a memory in accordance with each of the small sub-areas shown in FIG. 6.

FIG. 5 is a block diagram showing the construction of the discrimination circuit 18d. Numeral 101 denotes a parameter storage device, in the form of a random access memory (RAM), for storing such parameters as rapid traverse speed, acceleration/deceleration constants, entry forbidden areas, etc. These parameters can be entered in a manual data input mode MDI, or directly from an NC tape TP. The parameters are written also into a non-volatile memory 102 such as a magnetic bubble memory; when the numerical control device is turned on, the parameter data from the non-volatile memory 102 is read into the parameter storage device and is applied to a processing unit 103. To understand the operation of this unit, reference should also be had to FIG. 6, which shows how an area of allowable movement is divided into smaller areas in accordance with the shape of entry forbidden areas. The inputs to the processing unit 103 from the parameter storage device are coordinate values $P_1(X, Z)$, $P_2(I, K)$, $P_3(X_1, Z_1)$, $P_4(X_2, Z_2)$ which specify the boundaries of entry forbidden areas. On the basis of these coordinate values, the processing unit 103 divides the total maximum area of allowable movement MA into 56 sub-areas 00, 01, ..., 0F, ..., 37 by making eight partitions along the Z-axis and seven partitions along the X-axis, and creates entry forbidden information for each of these sub-areas 00, 01, ..., 0F, 11, 12, ..., 37. The hatched portions of FIG. 6 indicate the entry forbidden areas. OTA represents an overtravel area, defined by the maximum stroke, and EPA$_1$, EPA$_2$ represent first and second entry forbidden areas, respectively.

The entry forbidden information from the processing unit 103 is delivered to a write control circuit 104 which writes the information into a memory 105, each single bit of which corresponds to one of the sub-areas mentioned above. This can be understood with reference to FIG. 7 which shows how units of entry forbidden information are written into the memory locations corresponding to respective ones of the sub-areas. It will be appreciated that each bit of memory 104 is assigned to each one of the sub-areas, with a "1" being written into each bit constituting an entry forbidden area, and a "0" being written into each of the bits forming the sub-areas that lie outside the entry forbidden areas. Furthermore, 00, 01, ..., 37 are hexadecimal numbers, and the hexadecimal numbers in FIG. 6 correspond to those in FIG. 7. The processing unit 103 performs an operation to determine which bit of memory 105 is being referred to on the basis of the current position of the table, this information being provided by X-axis and Z-axis current position counters 108, 109 that will be described in more detail below. A read control circuit 106 receives the output of memory 105. An address register 107 designates the storage locations of memory 105 into which the entry forbidden information is to be written, or from which this information is to be read. The current position counters 108, 109 mentioned above indicate the current position of the table along the X and Z axes by counting up or counting down, in accordance with the travelling direction of the movable member, feedback pulses XFP, ZFP, each of which is generated by a pulse coder or the like (not shown) for each prescribed increment of movement of the movable member. Instead of these feedback pulses XFP, ZFP, however, pulses distributed along the X and Z axes by a pulse distributor (not shown) can be applied to the current position counters 108, 109 to be counted up or counted down in a similar manner. The information read out of the memory 105 by the read control circuit 106 is applied to a checking circuit 110, which determines on the basis of this information as to whether the movable member (the table or a tool) has entered a forbidden area.

The arrangement of FIG. 5 operates as follows. First, assume that the movable member, such as a tool, is located at point AP (sub-area 11) in FIG. 6. When the tool is moving in the +X direction, the processing unit 103 compares the boundary value X$_{02}$ (which is equal to X$_1$) with the current tool position X$_p$ and, when the tool is moving in the −X direction, the processing unit 103 compares the boundary value X$_{01}$ (which is equal to X) with the current position X$_p$. Similarly, the processing unit 103 compares the boundary value Z$_{01}$ (=K) with the current tool position Z$_p$, and the boundary value Z$_{00}$ with the current position Z$_p$, for movement in the +Z and −Z directions, respectively. When a boundary value is exceeded in the X direction, the processing circuit 103, according to whether such movement is in the + or − direction, adds eight to or subtracts eight from the content (=11) of the address register 107 for specifying the current addresses of memory 105. Similarly, when a boundary value is exceeded in the Z direction, the processing circuit 103, according to whether such movement is in the + or − direction, adds one to, or substracts one from, the content of the address register 107. The result of the addition or substraction operation is set in the address register. For instance, if the tool exceeds the boundary value X$_{02}$ while travelling in the +X direction, the value "19" (namely 11+8 in hexadecimal notation) is set in address register 107, and if it exceeds the boundary value X$_{01}$ while travelling in the −X direction, the value "09" (namely 11−8 in hexadecimal notation) is set in address register 107. Similarly, the value "12" (11+1 in hexadecimal notation) is set in the address register when boundary value Z$_{01}$ is exceeded in the +Z direction. Thus the current address corresponding to the sub-area currently occupied by the tool is set in the address register 107. At the same time that the above operation is taking place, the processing unit 103 continues comparing the X- and Z-direction boundary values with X$_p$ and Z$_p$ in accordance with the direction of tool movement, thereby updating the content of the address register 107 whenever a boundary is exceeded.

Accordingly, when the tool is moved in the +Z direction and crosses the boundary Z$_{01}$, "12" is set in the address register 107, so that the read control circuit 106 reads the "1" logic from the addressed location (shown by the hatched portion of FIG. 7) of memory 105. This "1" logic is applied to the checking circuit 110 which issues an alarm signal by recognizing, on the basis of the "1" logic, that the tool has entered the forbidden area EPA$_2$. The arrangement is such that the alarm signal activates a lamp (not shown) on the numerical control device. When the tool is moved in the +X direction and crosses the boundary X$_{02}$, "19" is set in the address register 107, so that a "0" is read out of the addressed location of memory 105. As stated previously, the processing unit 103 in this embodiment produces the entry forbidden information by using the coordinate values P$_1$(X, Z), P$_2$(I, K), P$_3$(X$_1$, Z$_1$), P$_4$(X$_2$, Z$_2$) which specify the boundaries of the entry forbidden areas, this information being stored in memory 105. It should be noted, however, that an arrangement can be adopted in which the boundaries are expressed by mathematical equations. Furthermore, the table 15 can be transported along a boundary in a dry-run mode instructed by the NC tape or by a manual data input (MDI), or by a jog feed operation, the table path traversed at such time serving as the boundary information input.

When defining a boundary for the final shape of the workpiece, the boundary should be so specified as to fall within said final shape by a prescribed tolerance.

The operation of the present invention will now be described with reference to FIG. 2. When a distributed pulse CP is generated by the pulse distributor in the numerical control device 11, the pulse is accumulated by the error register 12a in the servo circuit 12 and is also applied to the simulator 17. The content of error register 12a converted into an analog voltage by the DA converter 12b, is amplified by amplifier 12c and is then applied to the DC motor 13, which responds by rotating the ball screw 14 to transport the table 15 in the commanded direction. The position sensor 16 produces a single feedback pulse XFP for each prescribed increment of movement of the table 15, the feedback pulse entering the error register 12a to decrement its content by one step. The foregoing circuit elements construct a servo loop SL which keeps repeating the described operation, establishing a steady state in which the table 15 is transported at the commanded speed with a constant deviation value being maintained in error register 12a. As this operation proceeds, the series of distributed pulsed CP which have entered the simulator 17 are imparted with a primary delay characteristic by the simulator, the pulses emerging as the simulation pulses SP. As a result, the simulation pulses SP enter the reversible counter 18a in the current position checking circuit 18 of FIG. 4 with a characteristic which is identical with that of the feedback pulses FP, the content of the counter being downcounted by each pulse. On the other hand, the feedback pulses XFP enter the reversible counter 18a at its upcount input terminal, so that the counter is up-counted each time a feedback pulse XFP is generated. These feedback pulses XFP are applied also to the current position register 18c, whose content is updated stepwise in accordance with the direction of movement. The current position $X_p$ of the table along the X-axis thus is stored in register 18c.

When the servo system is operating normally, the feedback pulses XFP and simulation pulses SP are generated at approximately the same time intervals, so the content ER (the difference between XFP and SP) of reversible counter 18a does not exceed the predetermined value ME. If an abnormality should develop in the servo system, however, the content ER of reversible counter 18a will increase excessively and surpass the value ME (i.e., ER>ME). When the inequality ER>ME is established, the comparator 18b produces a "1" logic level, causing the OR gate 18e to deliver the alarm signal ALM which halts the machine instantly. In other words, in accordance with the present invention, the table 15 is not permitted to move as commanded on the input side of the numerical control device 11 when a situation develops in which the content ER of reversible counter 18a exceeds the predetermined value ME, the alarm signal ALM being issued just as if the tool had entered a forbidden area.

In concurrence with the foregoing checking operation, the discrimination circuit 18d uses the entry forbidden information stored in memory 105 (FIG. 5) to determine whether the current position AP resides in an entry forbidden area. If the table 15 should happen to be moved erroneously by a malfunction in the arithmetic circuitry, by an error in the NC tape read operation, or by an error committed by the operator, and if this should cause penetration of a forbidden area, the discrimination circuit 18d immediately detects the event in the manner described, issuing the alarm signal ALM through the OR gate 18e, thereby to bring the machine to an emergency stop.

Thus, in accordance with the present invention as described above, the simulator is provided to enable detection of a servo system error, and entry forbidden areas are defined in accordance with the commanded shape of a workpiece. Such an arrangement permits machine tool operation to be halted before the workpiece can be damaged by extraordinary movement of a tool relative to the workpiece, as may be caused by a malfunction in an arithmetic or servo system, by operator error, or by an error in reading an NC tape. Preventing such damage results in fewer wasted workpieces.

Another advantage of the present invention is that forbidden areas can be simply established, and penetration of such areas by a movable member such as a tool is reliably detected, without the use of limit switches or sensors. Furthermore, according to the present invention, whether a forbidden area has been penetrated or not is discriminated by dividing an area of allowable movement into a multiplicity of smaller sub-areas, computing entry forbidden information for each sub-area, storing the results of the computations in a memory beforehand, and reading the information out of the memory in accordance with the current position of the movable member. By virtue of such a method it is unnecessary to execute, on a one-by-one basis, operations to determine whether a forbidden area has been penetrated by the movable member. This permits the discrimination operation to be conducted at a high speed without subjecting the processing circuitry to a heavy load. It is also very simple with the present invention to change and to set the forbidden areas.

The present invention has been described and illustrated above in connection with controlling the movement of a tool or table employed in a numerically controlled machine tool. It is obvious that the invention is not limited to such an arrangement, but that it can be applied to control the movement of a robot arm as well. Moreover, though the forbidden areas are rectangularly shaped in the described embodiment, it goes without saying that they can have a triangular or circular configuration. In addition, the forbidden areas which are defined can be made to overlap one another.

As many apparently widely different embodiments of the present invention can be made without departing from the spirit and scope thereof, it is to be understood that the invention is not limited to the specific embodiment thereof except as defined in the appended claims.

What we claim is:

1. A numerical control method for controlling the movement of a movable member by setting entry forbidden areas which said movable member is forbidden to enter, said method comprising:
    entering path data for a movement path of the movable member;
    creating and storing in a memory, entry forbidden data relating to the boundaries of said entry forbidden areas, where said entry forbidden data can be noncorresponding to the path data, such that the entry forbidden data defines areas adjacent to the movement path as well as areas not adjacent to the movement path;
    monitoring the current position of the movable member;
    ascertaining on the basis of said entry forbidden data, whether the current position of said movable member resides within an entry forbidden area; and
    halting the movement of said movable member when the current position thereof has entered an entry forbidden area, so that if the movable member, which during normal operation should be moving along the movement path, enters the entry forbidden area, movement will be halted whether or not the area entered is adjacent to the movement path.

2. The numerical control method according to claim 1, in which said creating step comprises the steps of:
    entering coordinate values which specify the boundaries of the entry forbidden areas;
    dividing an area, over which the movable member is allowed to move, into a multiplicity of small sub-areas;
    determining, on the basis of said coordinate values, whether a sub-area is an entry forbidden area; and
    storing the entry forbidden data resulting from said determination in a memory location which corresponds to a respective sub-area.

3. The numerical control method according to claim 2, in which said ascertaining step comprises the steps of:

finding a memory location corresponding to a sub-area in which the current position of the movable member resides; and reading the entry forbidden data from said memory location.

4. The numerical control method according to claim 1, in which said creating step comprises the step of establishing an entry forbidden area corresponding to a commanded shape.

5. The numerical control method according to claim 4, in which said creating step is conducted by supplying the boundaries of said entry forbidden area corresponding to a command shape in the form of mathematical equations.

6. The numerical control method according to claim 4, in which supplying the boundaries of said entry forbidden area corresponding to a command shape is conducted while the movable member is being moved in a dry-run mode on the basis of numerical control data.

7. A numerical control apparatus for setting entry forbidden areas which a movable member is forbidden to enter, and for controlling the movement of said movable member along a movement path on the basis of numerical control data, which apparatus comprises:

memory means for storing entry forbidden data relating to the boundaries of the entry forbidden areas, said entry forbidden data can be noncorresponding to the numerical control data, such that the entry forbidden data defines area adjacent to the movement path as well as areas not adjacent to the movement path;

current position storage means for storing the current position of the movable member;

discrimination means, responsive to said memory means and said current position storage means, for ascertaining, on the basis of the entry forbidden data, whether the current position of the movable member resides within an entry forbidden area; and means for generating an alarm in response to penetration of an entry forbidden area by the current position of the movable member, so that if the movable member, which during normal operation should be moving along the movement path, enters the entry forbidden area, movement will be halted whether or not the area entered is adjacent to the movement path.

8. The numerical control apparatus according to claim 7, further comprising:

input means for entering coordinate values which specify the boundaries of the entry forbidden areas, and means for writing entry forbidden data into locations in said memory means corresponding to sub-areas obtained by dividing an area, over which the movable member is allowed to move, into a multiplicity of smaller areas on the basis of said coordinate values.

9. The numerical control apparatus according to claim 7, in which said discrimination means comprises:

means for computing a location in said memory means corresponding to a sub-area in which the current position of the movable member resides; and means for reading the entry forbidden data for said location in said memory means.

* * * * *

UNITED STATES PATENT AND TRADEMARK OFFICE
CERTIFICATE OF CORRECTION

PATENT NO. : 4,481,568
DATED : November 6, 1984
INVENTOR(S) : HAJIMU INABA ET AL It is certified that error appears in the above-identified patent and that said Letters Patent is hereby corrected as shown below:

Col. 3, line 52, "e" should be --e--;
line 63, "e" should be --ē--.

Col. 5, line 42, delete "as to".

Col. 6, line 23, "110" should be --110,--.

Signed and Sealed this

Fourteenth Day of May 1985

[SEAL]

Attest:

DONALD J. QUIGG

Attesting Officer     Acting Commissioner of Patents and Trademarks